No. 642,573. Patented Feb. 6, 1900.
D. C. BEMONT.
HORSESHOE.
(Application filed Mar. 27, 1899.)
(No Model.)
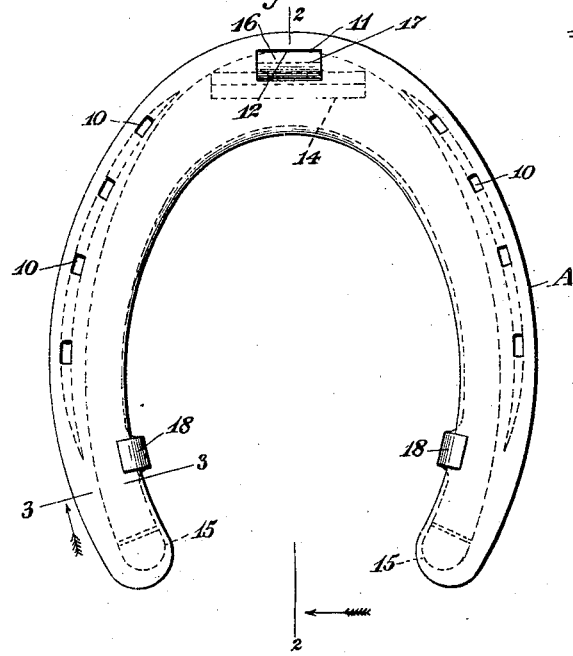
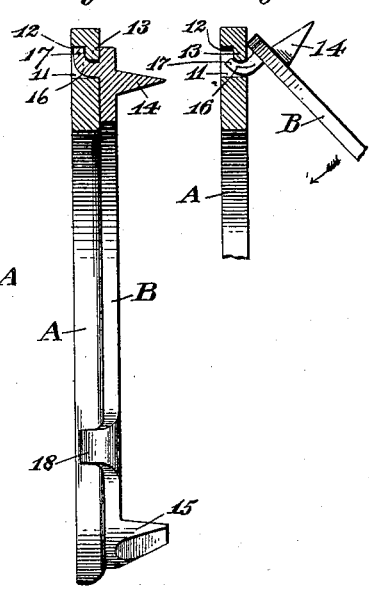
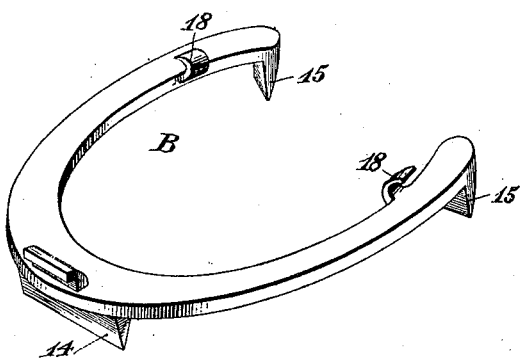
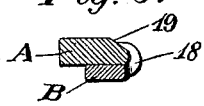
Witnesses:
Chas. F. Schulz
Geo. F. Hoffman
Inventor:
D. C. Bemont,
By his Attorney
F. H. Richards
THE NORRIS PETERS CO., PHOTO-LITHO., WASHINGTON, D. C.

UNITED STATES PATENT OFFICE.

DELOS C. BEMONT, OF GLASTONBURY, CONNECTICUT.

HORSESHOE.

SPECIFICATION forming part of Letters Patent No. 642,573, dated February 6, 1900.

Application filed March 27, 1899. Serial No. 710,619. (No model.)

*To all whom it may concern:*

Be it known that I, DELOS C. BEMONT, a citizen of the United States, residing in South Glastonbury, in the county of Hartford and State of Connecticut, have invented certain new and useful Improvements in Horseshoes, of which the following is a specification.

My invention relates to horseshoes having removable calks; and it has for its object the provision of a shoe of the class specified in which the several calks are formed substantially in one piece with a frame adapted to be readily placed in position on the shoe or to be removed therefrom when desired.

The circumstances which govern the employment of calks on horseshoes are so varied on account of changes in climate, roads, and the work to be performed that a great deal of annoyance and trouble is experienced in making the changes required by the different conditions mentioned, and therefore the particular object of my invention is to lessen the time and labor in making the necessary changes by arranging the several calks on a resilient frame, preferably made of spring-steel and conforming to the shape of the shoe, said frame being provided with clips or hooks, whereby it is firmly held in place after being sprung into position, as will be hereinafter described and as is illustrated in the accompanying drawings, in which—

Figure 1 is a top view of my improved horseshoe. Fig. 2 represents a section on line 2 2, Fig. 1. Fig. 3 is a section on line 3 3, Fig. 1. Fig. 4 is a perspective view of the calk-frame separate, and Fig. 5 illustrates the manner of attaching the frame to the shoe.

Similar characters designate like parts in all the figures of the drawings.

In the drawings, A designates a horseshoe of the usual shape or form and having at its under side the side channels and nail-holes 10 of ordinary construction, while at the toe portion thereof is provided an aperture 11, which is recessed, as at 12, to form a lip 13, extending between the end walls of the opening 11.

By referring to Fig. 2 it will be seen that the shoe A is made comparatively thin, so as to insure lightness in weight and a certain amount of resiliency of the web portions thereof, and its under side is formed flat to provide a solid footing for the animal when in the barn or pasture without subjecting the hoof to splitting or wear and the incidental trimming and paring required to fit new shoes to the feet.

In order to give to the animal its "working" shoe, calks are employed in connection with the shoe, such calks usually being three in number, one at the toe and two at the heel. Each of the calks has ordinarily been secured to the shoe by means of screws or analogous means, so that when it was desired to remove the calks on account of wear or of substituting another kind a great deal of time and labor had to be expended. To obviate this, I arrange the toe-calk 14 and the heel-calks 15 on a frame B, which is preferably made of spring-steel and similar in form to the shoe A and which is provided at the toe portion thereof with a projection or hook 16, adapted to enter and snugly fit the aperture 11, above mentioned, so as to cause the end 17 of the hook to rest within and fill the recess 12.

It will be noticed that the hook 16 projects nearly at a right angle from the frame or plate B, so that when the shoe and frame are in the positions shown in Fig. 2 said hook will serve not only to lock the said parts together at that point, but will, furthermore, prevent any lengthwise sliding movement of one or the other.

In Fig. 5 I have illustrated the manner in which the hook 16 is inserted into the aperture 11, after which the webs of the frame are swung toward the shoe, when they are slightly pressed together in order to permit the ears or hooks 18, formed on the frame, to engage the inner face of the shoe A, as clearly shown in Fig. 3, and in order to insure a close contact between the frame and shoe I preferably form at the inner side of the latter inclined faces, as 19, so that as the webs of said frame spread after being released such spreading action will tend to simultaneously force the frame toward the shoe.

The advantages of my improved horseshoe are manifest, as by its use summer-calks can easily be substituted for winter-calks, or vice versa, worn-out frames are readily replaced, and the horse in the pasture may be rendered fit for roadwork without trouble or skilled help.

If desired, calks of other material—as, for instance, malleable iron, leather, rubber, cork, &c.—may be individually secured to the frame in any well-known manner instead of being made integral with the same. It therefore follows that I do not confine my invention to the employment of a calk-frame having the several calks integrally formed thereon, as illustrated in the drawings.

Having described my invention, I claim—

The combination with a horseshoe having in its toe an aperture one wall of which is rabbeted, and having adjacent to each heel an inclined portion on its inner wall, of a resilient calk-plate provided with a hook the shank of which snugly fits the aperture, and the end of which fills the rabbet, in the toe of said horseshoe, said plate also having adjacent to each heel portion an ear or hook adapted to engage the inclined portions on the shoe when the plate is sprung into position, the construction being such that when the webs of said plates spread, the plate will be forced toward the shoe, substantially as and for the purpose specified.

DELOS C. BEMONT.

Witnesses:
CHARLES F. SCHMELZ,
HENRY BISSELL.